Oct. 14, 1924.                                                                                   1,511,656
H. A. CONGDON
VALVE AND OPERATING MECHANISM THEREFOR
Filed Oct. 17, 1921        3 Sheets-Sheet 3
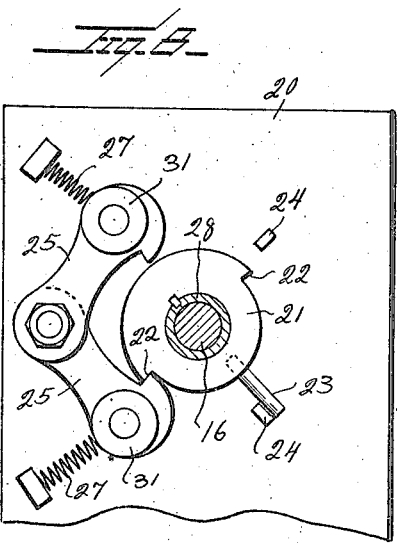
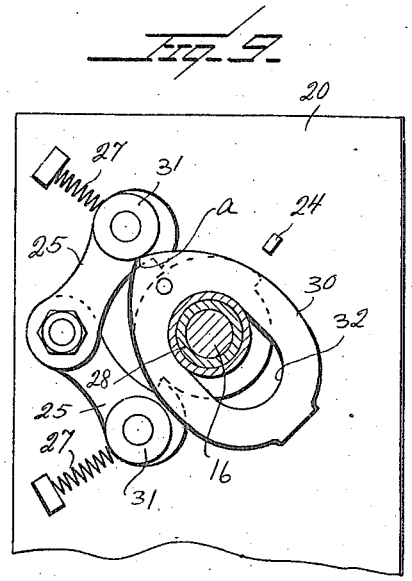
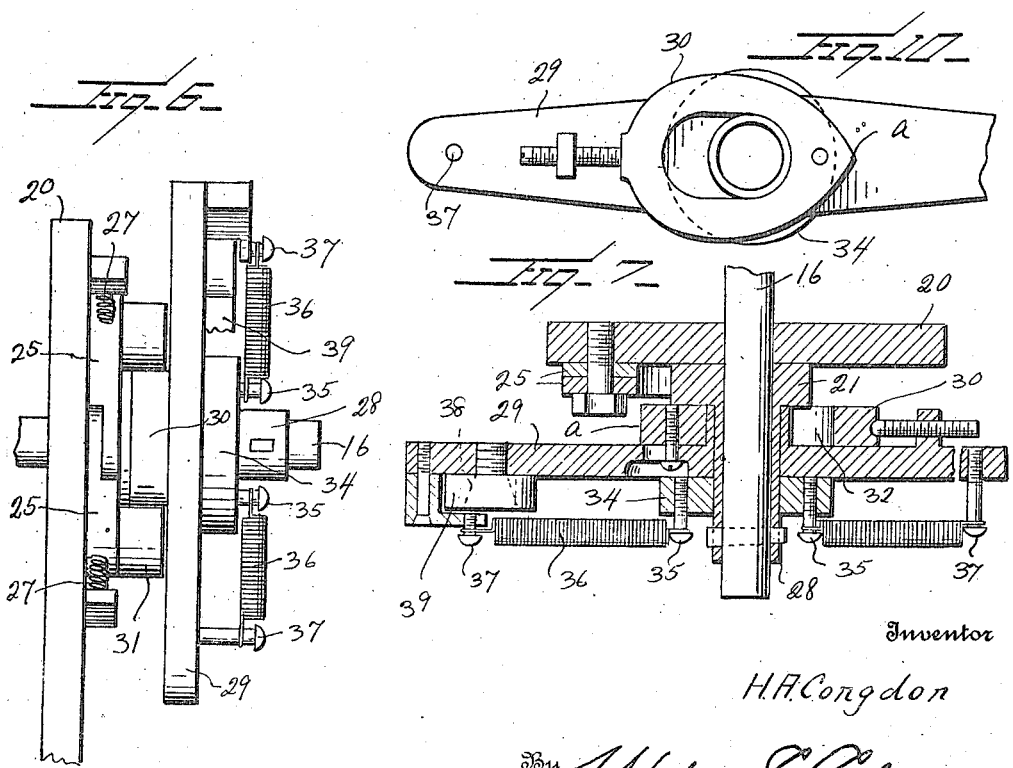
Inventor
H. A. Congdon
By Watson E. Coleman
Attorney Patented Oct. 14, 1924.

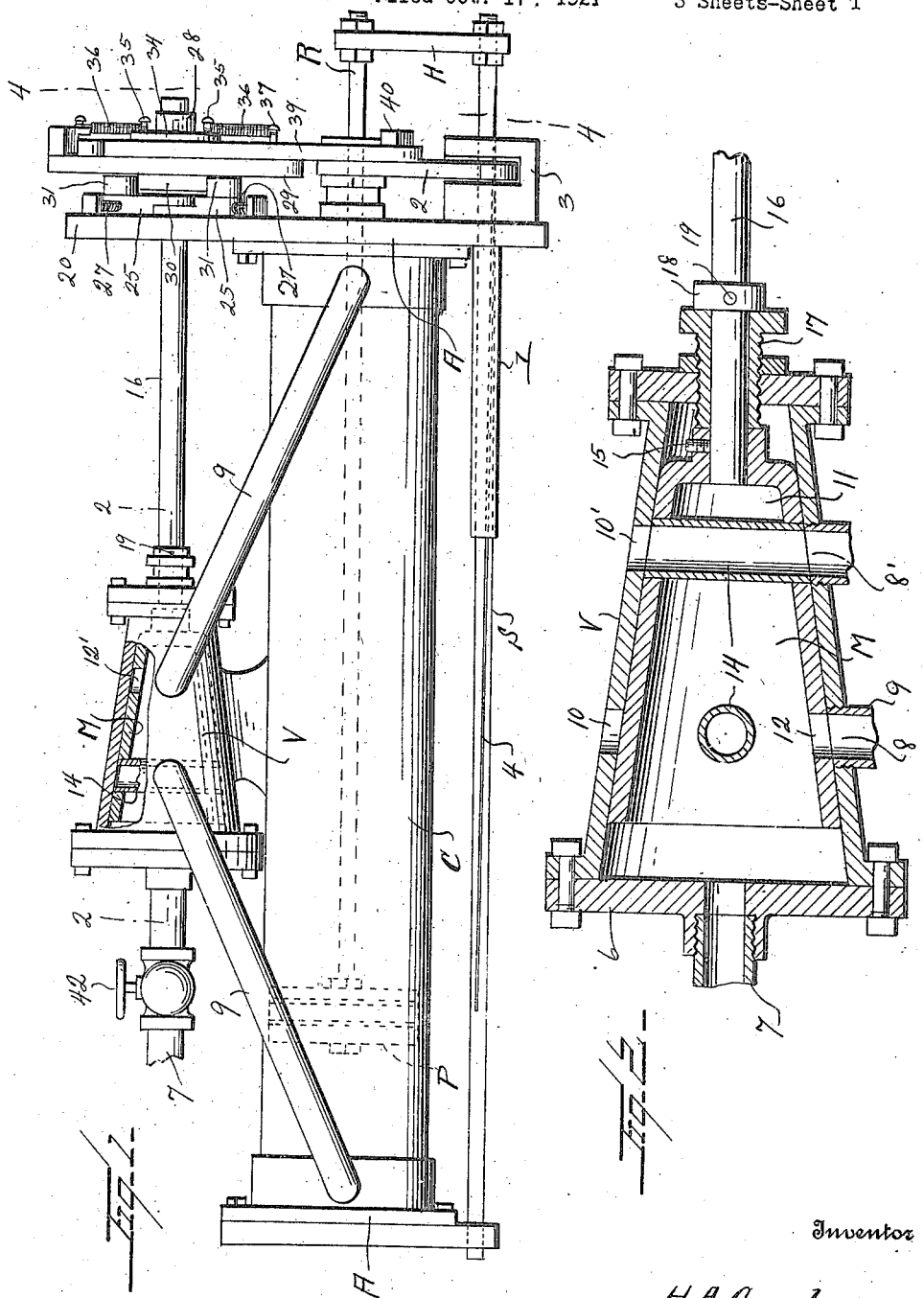

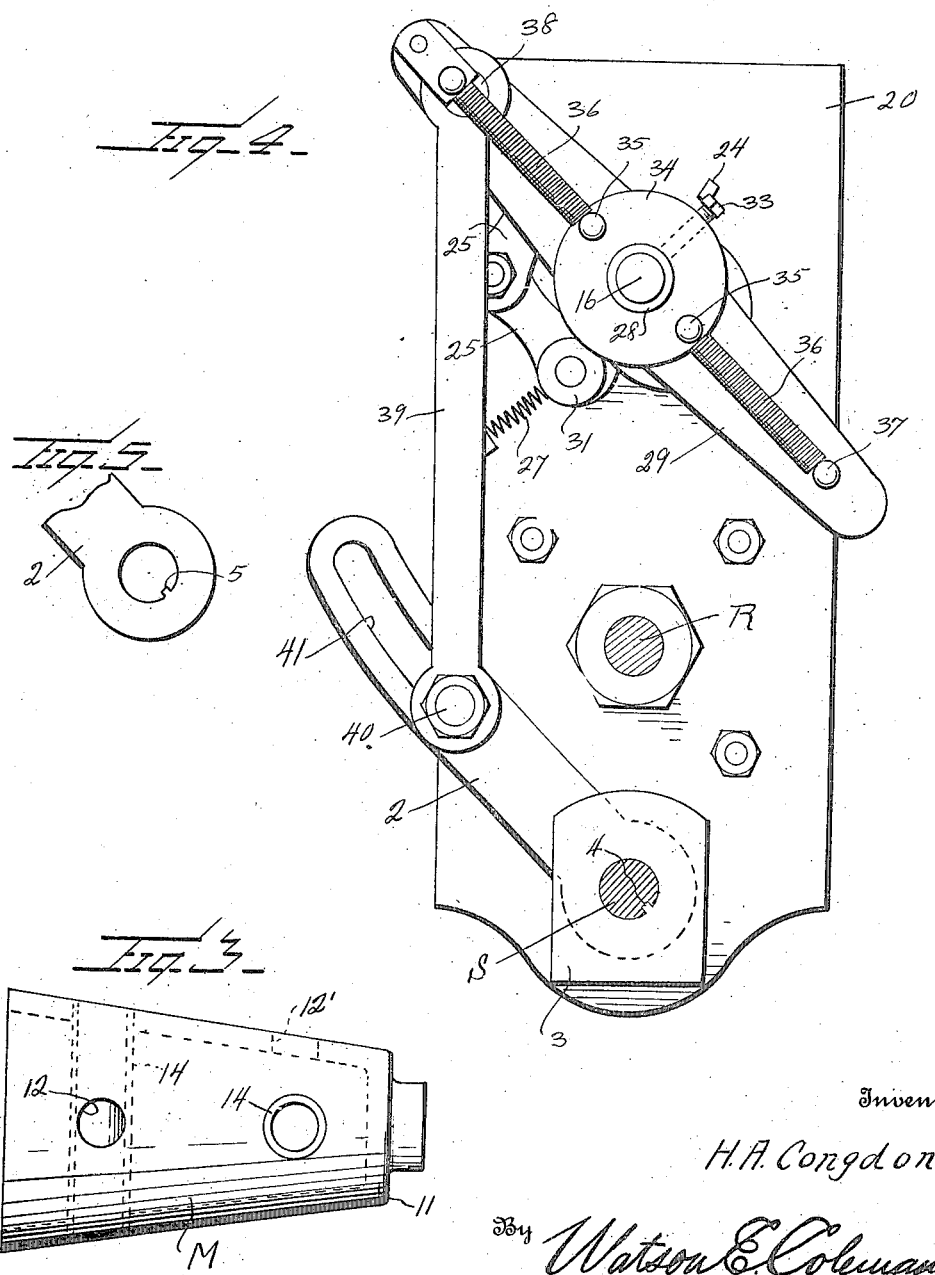

1,511,656

UNITED STATES PATENT OFFICE.

HENRY A. CONGDON, OF KINGSTON, RHODE ISLAND.

VALVE AND OPERATING MECHANISM THEREFOR.

Application filed October 17, 1921. Serial No. 508,259.

*To all whom it may concern:*

Be it known that I, HENRY A. CONGDON, a citizen of the United States, residing at Kingston, in the county of Washington and State of Rhode Island, have invented certain new and useful Improvements in Valves and Operating Mechanisms Therefor, of which the following is a specification, reference being had to the accompanying drawings.

This invention relates to certain improvements in valves and operating mechanisms therefor and has relation more particularly to a valve for controlling the ingress and egress of an operating fluid within the cylinder of an engine, and it is primarily an object of the invention to provide a controlling valve supported for rotary movement, together with means for intermittently rotating the valve in the desired direction and in timed sequence.

It is also an object of the invention to provide a novel and improved valve and operating mechanism therefor particularly adapted for use in connection with a cylinder in which operates a reciprocating piston and wherein means is provided to regulate the stroke of the piston in accordance with the requirements of practice.

An additional object of the invention is to provide a valve mechanism wherein the requisite movement of the valve is substantially instantaneous in its action at each end of the piston stroke and which embodies a structure wherein the valve and its associated mechanism is arranged exteriorly of the cylinder of the motor and which avoids the use of the different forms of tappet movements.

Furthermore, it is an object of the invention to provide novel and improved means for regulating and adjusting the length of stroke of the piston and to provide a valve movement which will allow of a widely variable speed by use of a throttle valve.

The invention consists in the details of construction and in the combination and arrangement of the several parts of my improved valve and operating mechanism therefor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation with portions broken away of a valve and operating mechanism therefor constructed in accordance with an embodiment of my invention;

Figure 2 is an enlarged fragmentary sectional view taken substantially on the line 2—2 of Figure 1;

Figure 3 is a view in side elevation of the valve member as herein disclosed;

Figure 4 is an enlarged sectional view taken substantially on the line 4—4 of Figure 1;

Figure 5 is a fragmentary view in elevation of the end portion of the lever arm for connection with its coacting shaft;

Figure 6 is an enlarged fragmentary view in side elevation of the mechanism for intermittently rotating the valve member;

Figure 7 is a sectional view taken through Figure 6 longitudinally of the elongated lever;

Figure 8 is a fragmentary view partly in section and partly in elevation illustrating the folding dogs or pawls and the parts associated therewith;

Figure 9 is a view similar to Figure 8 but showing the cam member in a position to release one of the dogs or pawls; and Figure 10 is a fragmentary elevational view of the elongated lever shown in Figure 6 and illustrating the mounting of the cam thereon.

As disclosed in the accompanying drawings, C denotes a cylinder in which is arranged for reciprocatory movement a piston P. The piston P has associated therewith the rod R which extends exteriorly of the cylinder C through a head A thereof. The outer or extended end portion of the rod R is connected by a yoke or cross head H with the rod or shaft S. The rod or shaft S is in parallelism with the rod R and is slidably disposed within a sleeve 1 herein disclosed as supported by the head A of the cylinder C. The yoke or cross head H serves to cause the rod R and the shaft or rod S to move in unison and in the same direction.

The shaft or rod S is also freely disposed through an end portion of the lever arm 2 extending outwardly and laterally with respect to the cylinder C. The end portion of the lever arm 2 through which the shaft or rod S passes is positioned between the fixed arms 3 so that the shaft or rod S may have free longitudinal movement through the lever arm 2 without displacing said arm 2.

The shaft or rod S is provided in its periphery with a longitudinally disposed spiral groove or channel 4, said groove being of a length equal to the length of the maximum stroke of the piston P within the cylinder C and extending one-quarter around the shaft or rod S. The lever arm 2 is provided with a key or lug 5 extending within the groove or channel 4 so that, upon a maximum stroke of the piston P, the lever arm 2 will be caused to swing or oscillate in an arc of ninety degrees and for a purpose to be hereinafter more particularly referred to.

As disclosed in the accompanying drawings, the cylinder C is substantially horizontally disposed and mounted upon said cylinder C and arranged exteriorly thereof is a valve casing V having its bore tapered with its smaller end disposed in a direction toward the head A of the cylinder C through which the rod R is directed. The opposite ends of the valve casing V are closed by the head plates 6.

Communicating within the valve casing V through the head plate 6 at the rear or larger end of the valve casing V is a pipe line 7 leading from a suitable source of compressed air or other fluid under pressure. The wall of the casing V at points spaced longitudinally thereof is provided with the ports 8 and 8' in communication with the opposite ends of the cylinder C through the conduits 9. Diametrically opposed to the ports 8 and 8' are the ports 10 and 10' in communication with the atmosphere.

Snugly fitting within the casing V is a hollow valve member M, the smaller end 11 thereof being closed while the opposite end portion is open. The wall of the member M is provided at longitudinally spaced points thereon with the ports 12 and 12', the ports also being spaced circumferentially of the member M to an extent of ninety degrees so that, upon a quarter turn of the member M in reverse directions, the ports 12 and 12' will be alternately brought into register with the ports 8 and 8' hereinbefore referred to.

Disposed through the member M at longitudinally spaced points thereof are the perpendicularly related tubes 14, one of said tubes being adapted to register with a pair of ports 8 and 10 or 8' and 10'. In other words, when a port 12 is in register with the port 8 to permit the ingress of fluid at one end of the cylinder C or to one side of the piston P, a tube 14 is in register with the ports 8 and 10' so that fluid at the opposite side of the piston may be readily exhausted. As the piston P reaches the end of its stroke, the valve member M is given a one-quarter turn, whereupon the port 12 is in register with the port 8' and the second tube 14 is in register with the ports 8 and 10 so that the requisite reverse movement of the piston P may be obtained.

Secured, as at 15, to the inner or closed end 11 of the member M is an end portion of a shaft 16 extending through the sleeve 17 threaded through the forward head plate 6. The inner end of the sleeve 17 abuts the closed end 11 of the valve member M while contacting with the outer end of the sleeve 17 is a collar 18 surrounding the shaft 16 and locked thereto by the set-screw 19 or the like. By proper manipulation of the sleeve 17, the valve member M may be adjusted as desired within the casing V along the longitudinal axis thereof.

The shaft 16 has its forward end portion disposed through and rotatably supported by an extension 20 of the front plate A of the cylinder C and keyed to the shaft 16 immediately adjacent the extension 20 is the wheel or disc 21 provided in its periphery with the pair of circumferentially spaced ratchet teeth 22, said teeth being substantially diametrically opposed. Radiating from the wheel or disc 21 is a finger or projection 23 adapted to engage the stops 24 extending outwardly from the extension 20 of the cylinder head A and whereby the limit of rotation of the wheel or disc 21, and the consequent rotation of the valve member M, in either direction is limited.

Pivotally supported by the extension 20 adjacent the wheel or disc 21 are the diverging pawls or dogs 25, one of the pawls or dogs engaging a ratchet tooth 22 when the wheel or disc 21 is substantially at the limit of its movement in one direction to positively hold said wheel or disc against rotary movement in the reverse direction. The second pawl or dog 25 engages the other ratchet tooth 22 for the same purpose when the wheel or disc 21 is at substantially the limit of its movement in the opposite direction. The pawls or dogs 25 are constantly urged toward the wheel or disc 21 by the expansible members or springs 27.

The wheel or disc 21 is provided with an outstanding elongated hub or bushing 28. An elongated lever 29 at its central portion is loosely mounted upon the sleeve or bushing 28 and carried by the face of said lever 29 opposed to the wheel or disc 21 is a cam member 30. The high point $a$ of the cam 30 is disposed in a direction lengthwise of the lever 29 and is adapted to have contact with the rollers 31 carried by the outer or free end portions of the dogs or pawls 25 and positioned to one side thereof. Upon rocking movement of the lever 29 in one direction, the cam 30 will disengage a pawl or dog 25 from its associated ratchet tooth 22 while the requisite movement of the lever 29 in the opposite direction will disengage the second pawl or dog 25 from its coacting ratchet tooth 22.

The central portion of the cam member 30 is provided with an elongated opening 32 through which the sleeve or bushing 28 is disposed and whereby it is permitted to adjust the cam member 30 lengthwise of the lever 29 so that said cam member may be positioned in exact accordance with the requirements of practice.

Keyed, as at 33, or otherwise secured to the sleeve or bushing 28 outwardly of but in close proximity to the lever 29 is a disc 34. The disc 34 at diametrically opposed points is provided with the outstanding members or pins 35 to which are secured the inner end portions of the retractile members or springs 36, the outer end portions of said members being secured to the outstanding pins 37 carried by the outer extremities of the lever 29. The tension of the springs 36 serves to normally maintain the disc 34 with the outstanding members or pins 35 thereof alined lengthwise of the lever 29.

Pivotally engaged, as at 38, with one end portion of the lever 29 is an end portion of a pitman 39, the opposite end portion of said pitman 39 being pivotally engaged, as at 40, with the lever arm 2 hereinbefore referred to.

In practice, as the piston P makes a stroke, the shaft or rod S, as hereinbefore described, causes the lever arm 2 to swing or oscillate in an arc of substantially ninety degrees and which movement is transmitted through the pitman 39 to the lever 29. This movement of the lever 29 places the expansible members or springs 36 under tension. The cam member 30 also moves with the lever 29 and when the piston P substantially finishes its stroke, the high point $a$ of the cam member 30 releases the pawl or dog 25 in locking engagement, whereupon the springs 36 will rotate the disc 34 and through the sleeve or bushing 28 also rotate a shaft 16 whereby the position of the valve member M is reversed so that the desired return stroke of the piston P may be obtained. Upon this movement of the shaft 16, the disc or wheel 21 will be rotated a distance sufficient to permit the second dog or pawl 25 to engage its associated ratchet tooth 22 so that the valve member M is locked against rotary movement until the piston P has substantially completed its reverse stroke.

The pivotal connection 40 for the pitman 39 is adjustable lengthwise of the lever arm 2 through the slot 41 in said arm 2. By adjusting this pivotal connection 40 along the slot 41, the stroke of the piston P may be lengthened or shortened as desired due to the fact that the closer the pivotal connection 40 is to the center of the arm 29, the operation of the lever 29 and its concomitant parts will be at closer or quicker intervals and vice versa.

The pipe line 7 has interposed therein a throttle valve 42 of a conventional type and through the instrumentality of this valve 42 and the operating mechanism for the valve member M, a widely variable speed of the engine or motor may be obtained.

From the foregoing description it is thought to be obvious that a valve and operating mechanism therefor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a cylinder, a reciprocating piston arranged within the cylinder and an oscillating valve for controlling the ingress and egress of the operating fluid within the cylinder, an operating shaft for the valve, a member loosely mounted on the shaft, a member fixed to the shaft, retractile means connecting the first named member and the second named member, means operable from the piston for swinging the first named member to place the retractile means under tension to rotate the shaft, a disc fixed to the shaft and provided with circumferentially spaced teeth, dogs supported adjacent the disc, one of said dogs engaging the tooth of the disc to hold the shaft against rotation when at substantially the limit of its movement in one direction, the second dog engaging the second tooth of the disc when at substantially the limit of its movement in a reverse direction to hold said shaft against rotation, and means carried by the first named member for releasing the dog from engagement with the disc when the piston reaches substantially the limit of its stroke.

2. In combination with a cylinder, a reciprocating piston arranged within the cylinder and an oscillating valve for controlling the ingress and egress of the operating fluid within the cylinder, an operating shaft for the valve, a member loosely mounted on the shaft, a member fixed to the shaft, retractile means connecting the first named member and the second named member, means operable from the piston for swinging the first named member to place the retractile means under tension to rotate the shaft, a disc fixed to the shaft and provided with circumferentially spaced teeth, dogs supported adjacent the disc, one of said dogs engaging the tooth of the disc to hold the shaft against rotation when at substantially the limit of its movement in one direction, the second dog engaging the second tooth of the disc when at substantially the limit of its movement in a reverse direction to hold said shaft against rotation, and a cam member carried by the first named member for releasing the dog from engagement with the disc when the piston reaches substantially the limit of its stroke.

In testimony whereof I hereunto affix my signature.

HENRY A. CONGDON.